(12) United States Patent
Katsumata et al.

(10) Patent No.: US 10,949,688 B2
(45) Date of Patent: Mar. 16, 2021

(54) MONITORING SYSTEM FOR PERSON IN A VEHICLE

(71) Applicants: Yazaki Corporation, Tokyo (JP); Hitachi Industry & Control Solutions, Ltd., Hitachi (JP)

(72) Inventors: Kenichi Katsumata, Shizuoka (JP); Kiyoshi Nasu, Ibaraki (JP); Hidekazu Ohashi, Ibaraki (JP)

(73) Assignees: YAZAKI CORPORATION, Tokyo (JP); Hitachi Industry & Control Solutions, Ltd., Hitachi (JP)

( * ) Notice: Subject to any disclaimer, the term of this patent is extended or adjusted under 35 U.S.C. 154(b) by 82 days.

(21) Appl. No.: 16/132,661

(22) Filed: Sep. 17, 2018

(65) Prior Publication Data
US 2019/0095734 A1    Mar. 28, 2019

(30) Foreign Application Priority Data
Sep. 25, 2017    (JP) .............................. JP2017-183383

(51) Int. Cl.
*G06K 9/00* (2006.01)
*G06T 7/70* (2017.01)
*B60R 1/00* (2006.01)

(52) U.S. Cl.
CPC ............ *G06K 9/00845* (2013.01); *B60R 1/00* (2013.01); *G06K 9/00201* (2013.01); *G06K 9/00362* (2013.01); *G06T 7/70* (2017.01); *B60R 2300/205* (2013.01); *G06T 2207/30268* (2013.01)

(58) Field of Classification Search
CPC ........... G06K 9/00845; G06K 9/00201; G06K 9/00362; G06T 7/70; G06T 2207/30268; B60R 1/00; B60R 2300/205; H04N 7/183
See application file for complete search history.

(56) References Cited

U.S. PATENT DOCUMENTS

| | | | |
|---|---|---|---|
| 6,947,071 B2* | 9/2005 | Eichmann ................. | B60R 1/00 348/142 |
| 2003/0023362 A1* | 1/2003 | Breed ................... | B60N 2/0248 701/45 |
| 2004/0026947 A1* | 2/2004 | Kitano ...................... | B60R 7/04 296/24.34 |

(Continued)

FOREIGN PATENT DOCUMENTS

| CN | 103796892 A | 5/2014 |
|---|---|---|
| JP | 2007-111247 A | 5/2007 |

(Continued)

*Primary Examiner* — Ming Y Hon
(74) *Attorney, Agent, or Firm* — Sughrue Mion, PLLC

(57) ABSTRACT

A monitoring system includes an imaging unit that captures an image including a monitoring target person in an interior compartment of a vehicle, a monitoring unit that detects a monitoring target part of the monitoring target person based on the image captured by the imaging unit and monitors a state of the monitoring target person based on a detected target part position serving as a position of the detected monitoring target part, and a display unit that is provided in the interior compartment of the vehicle and displays visual information representing a relative position of the detected target part position with respect to a preset appropriate monitoring position.

10 Claims, 6 Drawing Sheets

(56) References Cited

U.S. PATENT DOCUMENTS

| | | | | |
|---|---|---|---|---|
| 2005/0030184 | A1* | 2/2005 | Victor | B60K 28/06 |
| | | | | 340/576 |
| 2007/0040910 | A1* | 2/2007 | Kuwata | B60R 1/00 |
| | | | | 348/148 |
| 2008/0181591 | A1* | 7/2008 | Hongo | G03B 17/00 |
| | | | | 396/50 |
| 2010/0086178 | A1* | 4/2010 | Allen | G06K 9/00362 |
| | | | | 382/104 |
| 2012/0268262 | A1* | 10/2012 | Popovic | B60Q 9/008 |
| | | | | 340/438 |
| 2013/0009761 | A1 | 1/2013 | Horseman | |
| 2014/0015971 | A1* | 1/2014 | DeJuliis | A61B 5/6893 |
| | | | | 348/148 |
| 2015/0002286 | A1 | 1/2015 | Kasai et al. | |
| 2016/0250968 | A1* | 9/2016 | Shirakata | B60W 50/16 |
| | | | | 340/576 |
| 2017/0161576 | A1 | 6/2017 | Banno et al. | |
| 2017/0210357 | A1* | 7/2017 | Nagai | B60K 28/06 |
| 2017/0282792 | A1* | 10/2017 | Illy | H04S 5/00 |
| 2018/0014754 | A1* | 1/2018 | Gray | A61B 5/1036 |
| 2018/0081181 | A1* | 3/2018 | Lambert | G02B 27/0189 |

FOREIGN PATENT DOCUMENTS

| | | |
|---|---|---|
| JP | 2009-113621 A | 5/2009 |
| JP | 2015-7933 A | 1/2015 |
| JP | 2016-27452 A | 2/2016 |
| JP | 2016-038793 A | 3/2016 |
| WO | 2002/096714 A1 | 12/2002 |

\* cited by examiner

I1

BAD                                    GOOD

MONITORING SYSTEM FOR PERSON IN A VEHICLE

CROSS-REFERENCE TO RELATED APPLICATION(S)

The present application claims priority to and incorporates by reference the entire contents of Japanese Patent Application No. 2017-183383 filed in Japan on Sep. 25, 2017.

BACKGROUND OF THE INVENTION

1. Field of the Invention

The present invention relates to a monitoring system.

2. Description of the Related Art

For example, Japanese Patent Application Laid-open No. 2016-038793 discloses, as a conventional monitoring system mounted on a vehicle, a driver monitoring system including a detection unit, a determination unit, a notification unit, and a vehicle stopping unit. The detection unit detects a postural collapse of a driver based on an image of the driver's seat of the vehicle captured by a camera. The determination unit determines whether the postural collapse of the driver detected by the detection unit is caused by a habit of the driver. The notification unit notifies the driver of the postural collapse based on a state different between a case where the postural collapse is determined to be caused by the habit of the driver by the determination unit and a case where the postural collapse is determined to be caused by other factors than habit of the driver by the determination unit. After the notification unit gives the driver a heads-up, if the posture of the driver is not improved and a predetermined condition is met, the vehicle stopping unit outputs a signal to safely stop the vehicle to a vehicle control device.

For example, to ensure appropriate monitoring, the driver monitoring system described in Japanese Patent Application Laid-open No. 2016-038793 is desired to have a configuration that can allow, for example, a monitoring target person to appropriately understand the current operating state of the system.

SUMMARY OF THE INVENTION

The present invention has been made in view of the above-described circumstances, and an object thereof is to provide a monitoring system capable of allowing, for example, the monitoring target person to understand the operating state.

In order to achieve the above mentioned object, a monitoring system according to one aspect of the present invention includes an imaging unit configured to capture an image including a monitoring target person in an interior compartment of a vehicle; a monitoring unit configured to detect a monitoring target part of the monitoring target person based on the image captured by the imaging unit and monitor a state of the monitoring target person based on a detected target part position serving as a position of the detected monitoring target part; and a display unit provided in the interior compartment of the vehicle and configured to display visual information representing a relative position of the detected target part position with respect to a preset appropriate monitoring position.

According to another aspect of the present invention, in the monitoring system, it is possible to configure that the display unit is configured to display, as the visual information, a state display image that changes in display color according to a relative position of the detected target part position with respect to the appropriate monitoring position.

According to still another aspect of the present invention, in the monitoring system, it is possible to configure that the display unit is configured to display, as the visual information, an appropriate position image representing the appropriate monitoring position in combination with a detected position image representing the detected target part position.

According to still another aspect of the present invention, it is possible to configure that the monitoring system further includes a housing that is provided on a surface on the interior compartment side of a ceiling of the vehicle, and to which the imaging unit, the monitoring unit, and the display unit are assembled.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail an embodiment of the present invention based on the drawings. The embodiment does not limit the present invention. Components in the following embodiment include those interchangeable by and easy to those skilled in the art, or those substantially identical to such components.

Embodiment

Figure 1:
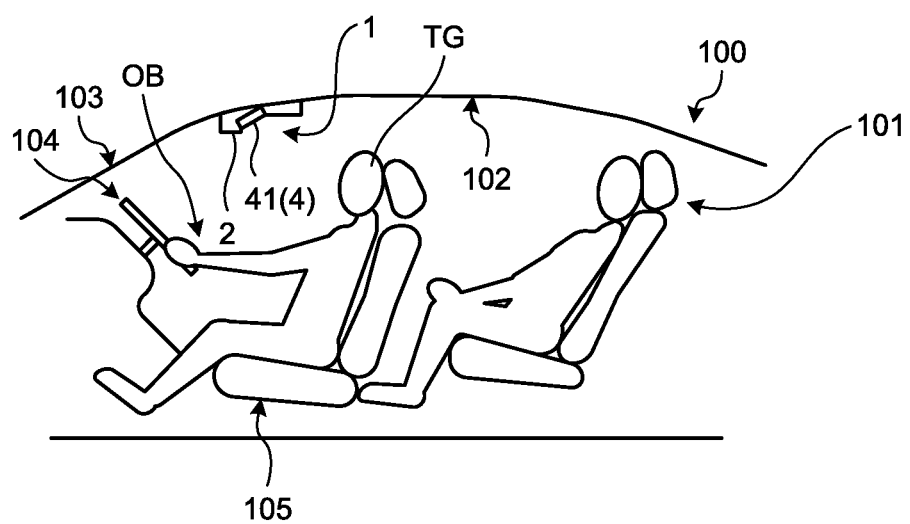
FIG. 1 is a schematic diagram illustrating a schematic configuration of an interior compartment of a vehicle to which a monitoring system according to an embodiment of the present invention is applied.
Figure 2:
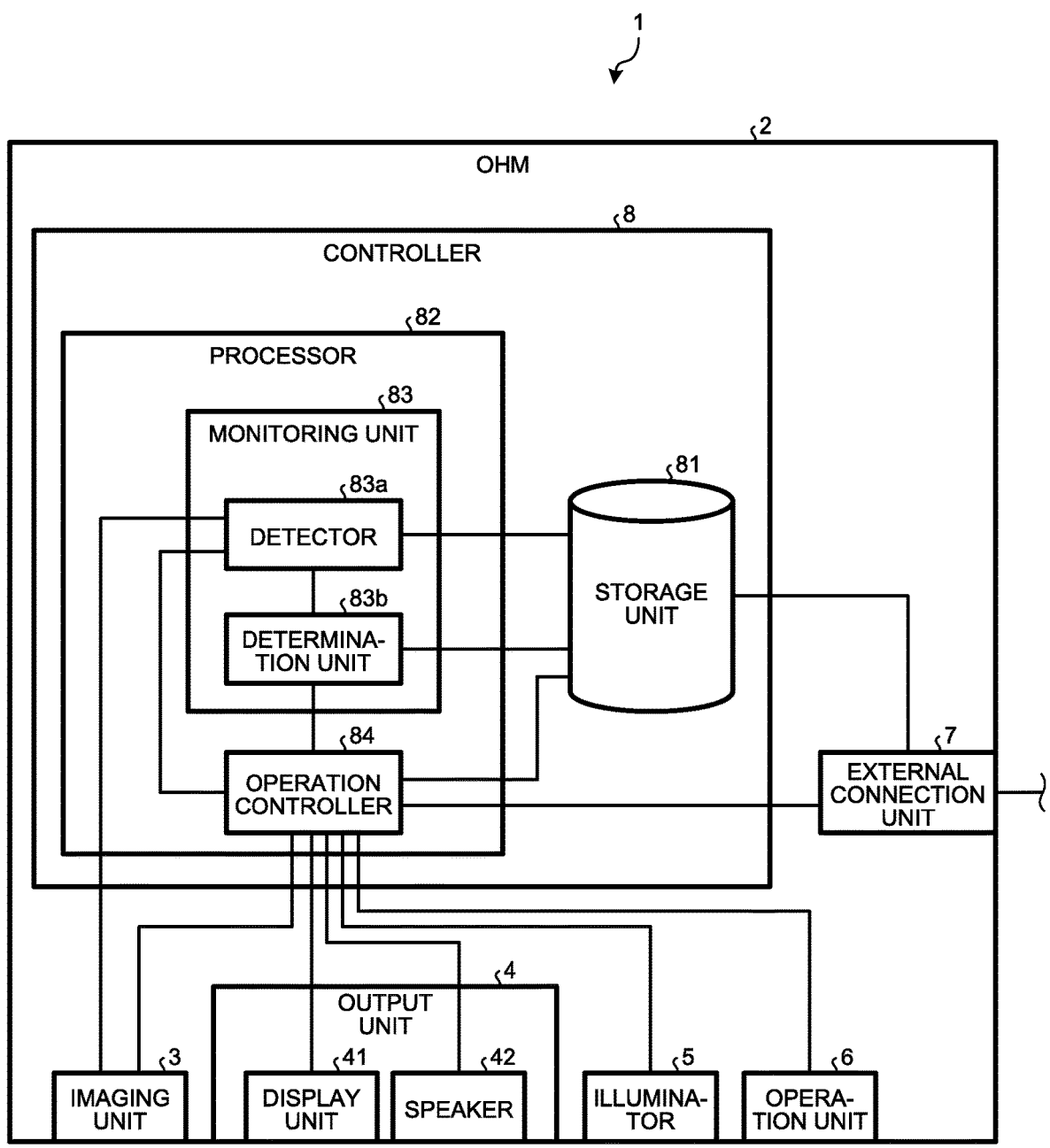
FIG. 2 is a block diagram illustrating a schematic configuration of the monitoring system according to the embodiment.
Figure 3:
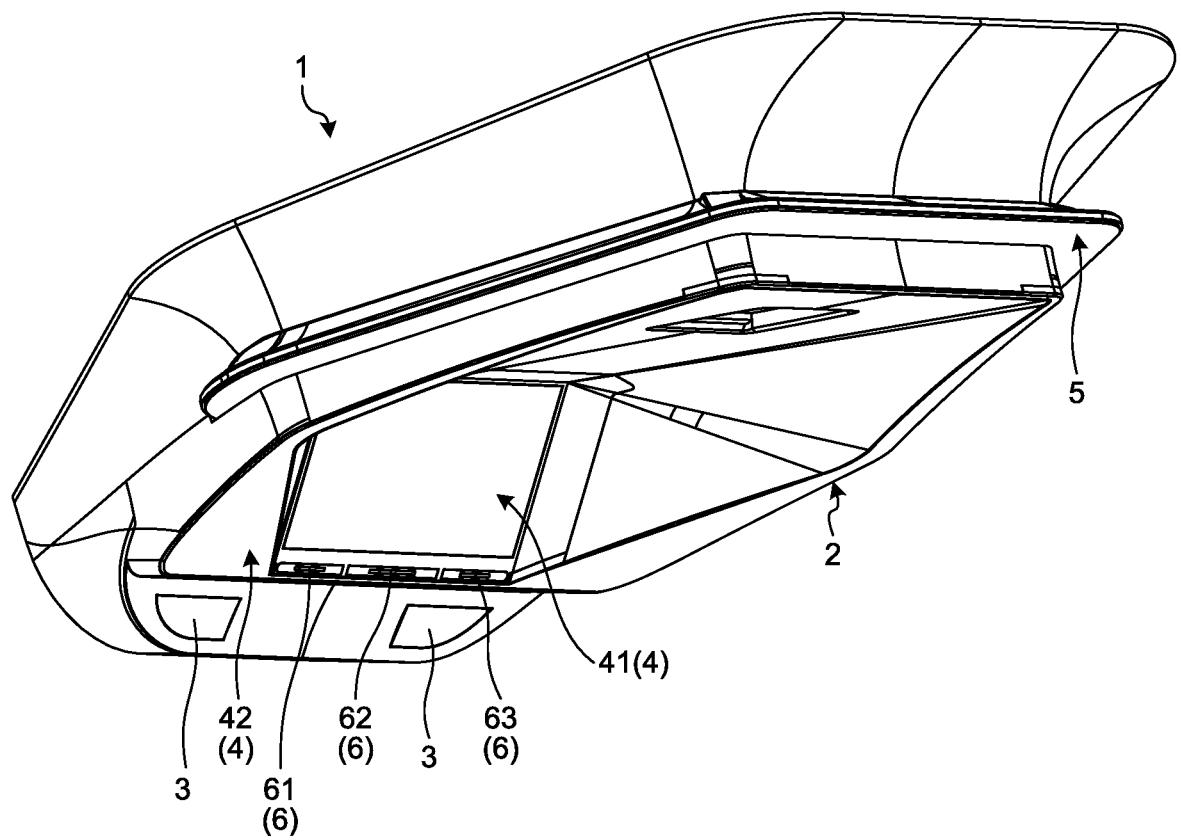
FIG. 3 is a perspective view illustrating an external appearance of the monitoring system according to the embodiment.

A monitoring system 1 according to the present embodiment illustrated in FIGS. 1, 2, and 3 is an in-vehicle system (vehicle interior monitoring system) that is mounted on a vehicle 100, and that monitors a monitoring target person OB in an interior compartment 101 of the vehicle 100 and performs various type of processing when the monitoring target person OB is in an abnormal state. The monitoring target person OB is a person monitored by the monitoring system 1. The monitoring target person OB is an occupant on board the interior compartment 101 of the vehicle 100, and includes the driver or a passenger other than the driver of the vehicle 100. The description will be made on the assumption that the monitoring target person OB of the present embodiment is, as an example, the driver. The monitoring system 1 of the present embodiment is provided on a surface on the interior compartment 101 side of a ceiling 102 of the vehicle 100, and constitutes an overhead module (OHM) integrating various types of functions. The following describes in detail the configuration of the monitoring system 1 with reference to the drawings.

Specifically, the monitoring system 1 includes a housing 2, an imaging unit 3, an output unit 4, an illuminator 5, an operation unit 6, an external connection unit 7, and a controller 8. The monitoring system 1 constituting the overhead module may additionally include, for example, a wireless communication unit, an antenna, and a power distribution unit.

The housing 2 accommodates the components of the monitoring system 1. The housing 2 is formed into a hollow box shape as a whole by combining a plurality of members. The housing 2 is formed of a synthetic resin having an insulating property. Herein, the imaging unit 3, the output unit 4, the illuminator 5, the operation unit 6, the external connection unit 7, and the controller 8 are assembled and accommodated in the housing 2, and are unitized as the overhead module. The imaging unit 3, the output unit 4, the illuminator 5, the operation unit 6, and the external connection unit 7 accommodated in the housing 2 are partially exposed from an outer surface thereof. The housing 2 of the present embodiment is provided on the surface on the interior compartment 101 side of the ceiling (roof panel) 102 of the vehicle 100. The ceiling 102 is a structure that is connected to a vehicle main body through, for example, pillars and supported on an upper side in the vertical direction of the vehicle main body. The vehicle 100 is divided into the interior compartment 101 and the exterior by the ceiling 102 serving as a boundary on the upper side in the vertical direction. Herein, the housing 2 is provided, for example, at a portion that is located at an intersecting portion between the ceiling 102 and a windshield 103, and is located in a substantially central position in the vehicle width direction of the vehicle 100. The windshield 103 is provided at a front portion of the vehicle 100, and serves as a boundary between the interior compartment 101 and the exterior, and the windshield 103 is also called a front glass. Typically, the housing 2 is provided at a position within reach of a hand of the driver serving as the monitoring target person OB sitting in a driver's seat 105 facing a steering wheel 104 serving as a steering member for steering the vehicle 100.

The imaging unit 3 captures an image including the driver serving as the monitoring target person OB in the interior compartment 101 of the vehicle 100. The imaging unit 3 of the present embodiment has a function to capture a three-dimensional image of the driver sitting on the driver's seat 105 as the state of the monitoring target person OB enabling the three-dimensional position of the driver to be measurable. The imaging unit 3 is composed of an imaging device, such as a stereo camera. The imaging unit 3 is provided in the housing 2 such that lenses of the stereo camera are exposed from the outer surface of the housing 2 and the optical axes thereof are directed toward the driver's seat 105 in the interior compartment 101. The imaging unit 3 is electrically connected to the controller 8 and can transmit and receive electrical signals thereto and therefrom, and the controller 8 controls the operations of the components of the imaging unit 3. For example, the imaging unit 3 outputs the captured image to the controller 8. The imaging unit 3 may be composed of, in place of the stereo camera, a time-of-flight (ToF) camera or another single-lens camera that has the function to capture the three-dimensional image.

The output unit 4 outputs various types of information toward the interior compartment 101 of the vehicle 100. Herein, the output unit 4 includes a display unit 41 and a speaker 42. The display unit 41 is a visual information display device that outputs visual information (graphic information and textual information), and is composed of, for example, a liquid crystal display, a plasma display or an organic electroluminescent (EL) display having a small thickness. The display unit 41 is provided in the housing 2 such that a display surface for displaying the visual information is exposed from the outer surface of the housing 2 and is directed toward the driver's seat 105 in the interior compartment 101. The display unit 41 is typically provided at a position visible from the monitoring target person OB. That speaker 42 is an auditory information output device that outputs auditory information (voice information and sound information). Each of the display unit 41 and the speaker 42 included in the output unit 4 is electrically connected to the controller 8 and can transmit and receive electrical signals thereto and therefrom, and the controller 8 controls the operations of the components of the display unit 41 and the speaker 42. For example, the display unit 41 displays the visual information, such as the image output from the imaging unit 3 via the controller 8. The output unit 4 may include, in addition to the display unit 41 and the speaker 42, for example, a tactile information output device that outputs, for example, tactile information, such as a steering wheel vibration, a seat vibration, and a pedal reaction force of the vehicle 100.

The illuminator 5 illuminates the interior compartment 101 of the vehicle 100, and is, for example, a map lamp. The illuminator 5 includes, for example, light sources, such as light-emitting diode (LED) elements that emit light having various luminescent colors, such as white light, red light, blue light, and green light. The illuminator 5 is provided in the housing 2 such that an emitting surface for emitting the illuminating light is exposed from the outer surface of the housing 2 and is directed toward the interior compartment 101. The illuminator 5 is electrically connected to the controller 8 and can transmit and receive electrical signals thereto and therefrom, and the controller 8 controls the operations of the components of the illuminator 5. For example, the illuminator 5 is controlled by the controller 8 to be turned on or turned off in response to an operational input to the operation unit 6.

The operation unit 6 is an operation medium through which various operations can be entered from the interior compartment 101 side of the vehicle 100. The operation unit 6 is composed of, for example, push buttons or non-contact sensors, such as capacitive touch sensors and infrared sensors. The operation unit 6 is provided in the housing 2 such that portions thereof for receiving the operations are exposed at a position within reach of a hand of the occupant on the outer surface of the housing 2 and directed to the interior compartment 101 side. Herein, as an example, the operation unit 6 includes, for example, an illumination operation unit 61 for switching between on and off of the illuminator 5, a display operation unit 62 for switching the display content displayed by the display unit 41, and a setting operation unit 63 for making various settings of the monitoring system 1. Each of the illumination operation unit 61, the display operation unit 62, and the setting operation unit 63 included in the operation unit 6 is electrically connected to the controller 8 and can transmit and receive electrical signals thereto and therefrom, and the controller 8 controls the operations of the components of these operation units 61, 62, and 63. For example, the operation unit 6 outputs an operational signal to the controller 8 in response to an operational input.

The external connection unit 7 is a part electrically connected to electrical equipment outside the housing 2. The external connection unit 7 is composed of various types of connectors and interface units. Herein, the external connection unit 7 is electrically connected to, for example, vehicle electronic control unit (ECU) that integrally controls the components of the vehicle 100 and a rear module provided at a position on the rear seat side of the surface on the interior compartment 101 side of the ceiling 102 of the vehicle 100. The external connection unit 7 is electrically connected to the controller 8 and the electrical equipment outside the housing 2, and can transmit and receive electrical signals thereto and therefrom.

The controller 8 is a part that integrally controls the components of the monitoring system 1. The controller 8 performs various types of arithmetic processing related to the monitoring of the state of the monitoring target person OB and various assistances thereto. The controller 8 includes electronic circuitry that mainly includes a known microcomputer including a central arithmetic processing device, such as a central processing unit (CPU), a microprocessing unit (MPU), an application-specific integrated circuit (ASIC), and a field-programmable gate array (FPGA), and includes a read-only memory (ROM), a random access memory (RAM), and an interface. The controller 8 is electrically connected to the imaging unit 3, the output unit 4, the illuminator 5, the operation unit 6, and the external connection unit 7. The controller 8 can transmit and receive various electrical signals, such as an image signal corresponding to the captured image and drive signals for driving the components of the imaging unit 3, the output unit 4, the illuminator 5, the operation unit 6, and the external connection unit 7, to and from these units 3, 4, 5, 6, and 7.

Specifically, the controller 8 includes a storage unit 81 and a processor 82 from the point of view of a functional conception. The storage unit 81 and the processor 82 can transmit and receive various types of information to and from various devices electrically connected thereto. The storage unit 81 is a storage device, such as a memory. The storage unit 81 stores therein, for example, conditions and information required for the various types of processing in the controller 8 and various programs to be executed by the controller 8. The storage unit 81 also stores therein the visual information, such as some of the images to be displayed on the display unit 41, and the auditory information, such as voices to be output from the speaker 42. The storage unit 81 can also temporarily store therein information on the image captured by the imaging unit 3 and various types of information acquired via the external connection unit 7. For example, the processor 82 (a monitoring unit 83 (a detector 83a and a determination unit 83b) and an operation controller 84, which are to be described later) reads these pieces of information from the storage unit 81 as needed. The processor 82 executes the various programs stored in the storage unit 81 based on, for example, various input signals, and the programs run to output output signals to the components so as to execute various types of processing for performing the various types of functions. The processor 82 includes, more in detail, the monitoring unit 83 and the operation controller 84 from the point of view of the functional conception.

The monitoring unit 83 is a part capable of executing monitoring processing. The monitoring processing is processing to monitor the state of the monitoring target person OB based on the image captured by the imaging unit 3. The monitoring unit 83 detects a monitoring target part TG of the monitoring target person OB based on the image captured by the imaging unit 3. The monitoring unit 83 monitors the state of the monitoring target person OB based on a detected target part position serving as a position of the detected monitoring target part TG. The monitoring target part TG detected by the monitoring unit 83 is a part of the monitoring target person OB to be monitored, and is, for example, the head of the monitoring target person OB, but is not limited thereto.

More specifically, the monitoring unit 83 includes the detector 83a and the determination unit 83b from the point of view of the functional conception. The detector 83a and the determination unit 83b are electrically connected to each other, and also electrically connected to the storage unit 81 and the operation controller 84. In addition, the detector 33a is electrically connected to the imaging unit 3. The detector 83a is a part that detects the three-dimensional position (position coordinates) of the monitoring target part TG, that is, herein, the head of the monitoring target person OB based on the image captured by the imaging unit 3. Using various known image processing techniques and image recognition techniques, the detector 83a detects the head of the monitoring target person OB as the monitoring target part TG, and detects the three-dimensional position thereof. The detector 83a detects the three-dimensional position of the head as the monitoring target part TG of the monitoring target person OB in a real-time manner based on the image captured by the imaging unit 3. The determination unit 83b is a part that determines the state of the monitoring target person OB based on the detected target part position serving as the three-dimensional position of the monitoring target part TG detected by the detector 83a. Using various known methods, the determination unit 83b determines the state of the monitoring target person OB based on the detected target part position of the monitoring target part TG detected by the detector 83a and the movement of the detected target part position. The determination unit 83b distinguishes, for example, between a normal state and an abnormal state, and determines the result as the state of the monitoring target person OB. In other words, the determination unit 83b distinguishes and determines whether the monitoring target person OB is in the normal state or the abnormal state, for example, based on the position and the movement of the head of the monitoring target person OB. The determination unit 83b determines that the monitoring target person OB is in the abnormal state if, for example, the detected target part position (in other words, the position of the head) makes an abnormal movement.

The operation controller 84 is a part capable of executing operation control processing. The operation control processing is processing to control the operations of the components of the monitoring system 1, such as those of the imaging unit 3, the output unit 4, the illuminator 5, and the operation unit 6. The operation controller 84 is electrically connected to the imaging unit 3, the output unit 4 (the display unit 41 and the speaker 42), the illuminator 5, the operation unit 6 (the illumination operation unit 61, the display operation unit 62, and the setting operation unit 63), the external connection unit 7, the storage unit 81, and the monitoring unit 83 (the detector 83a and the determination unit 83b). The operation controller 84 can control the operation of the imaging unit 3 by outputting a drive signal to the imaging unit 3, and can start and end the capturing of the image including the monitoring target person OB. The operation controller 84 can control the operation of the output unit 4 by outputting a drive signal to the output unit 4 (the display unit 41 and the speaker 42), and can display the visual information on the display unit 41 and output the auditory information from the speaker 42. The operation controller 84 can control the operation of the illuminator 5 by outputting a drive signal to the illuminator 5, and can turn on and turn off the illuminator 5. In addition, the operation controller 84 can receive the operational input to the operation unit 6 based on the operational signal received from the operation unit 6 (the illumination operation unit 61, the display operation unit 62, or the setting operation unit 3), and can switch between on and off of the illuminator 5, switch the display content displayed by the display unit 41, or make the various settings. The operation controller 84 can also control the operations of the components of, for example, the output unit 4, for example, based on the determination result on the state of the monitoring target person OB made by the determination unit 83b. In this case, the operation controller 84 may control the output unit 4 to output various types of information, including a heads-up and a warning, based on the determination result on the state of the monitoring target person OB made by the determination unit 83b. For example, the operation controller 84 may control the output unit 4 not to output any information on the monitoring if the determination unit 83b has determined that the state of the monitoring target person OB is the normal state. If, instead, the determination unit 83b has determined that the state of the monitoring target person OB is the abnormal state, the operation controller 84 may control the output unit 4 to output the information representing the heads-up or the warning to the monitoring target person OB. After controlling the output unit 4 to output the warning, if a predetermined assist starting condition (such as a lapse of a predetermined time) is met, the operation controller 84 may output an assist request signal to the vehicle ECU via the external connection unit 7 to cause the vehicle ECU to provide any of various types of assists, such as automatic deceleration and automatic stopping of the vehicle 100 and a notification to an emergency contact.

Figure 4:
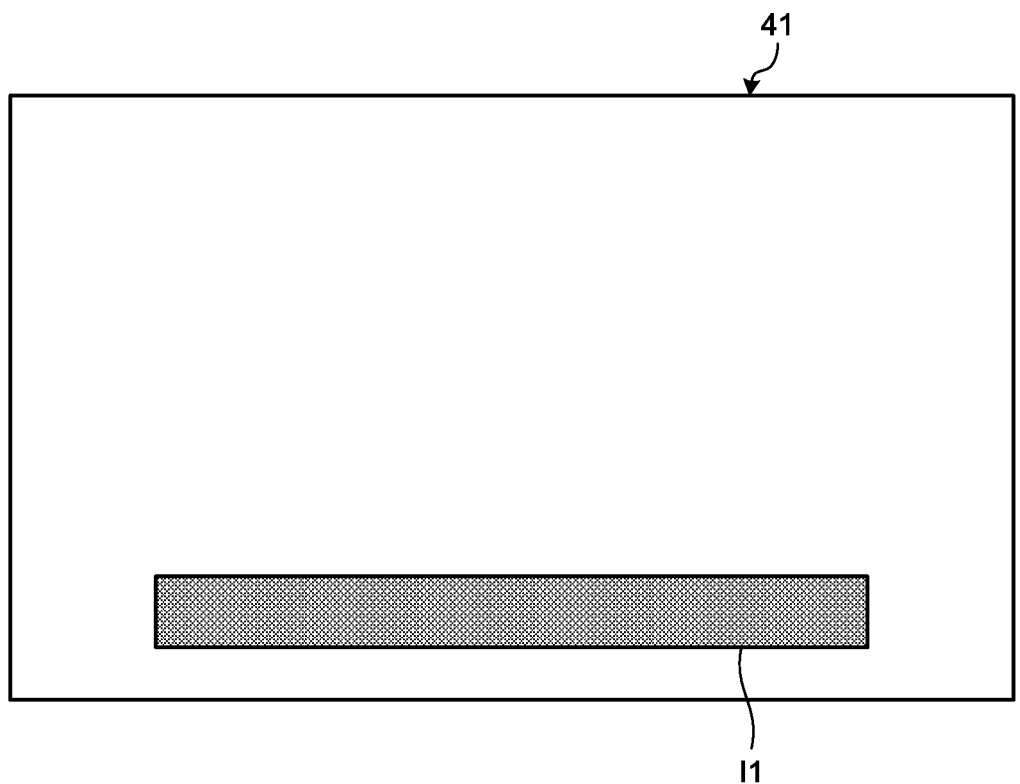
FIG. 4 is a schematic diagram illustrating an example of a display mode on a display unit of the monitoring system according to the embodiment.
Figure 8:
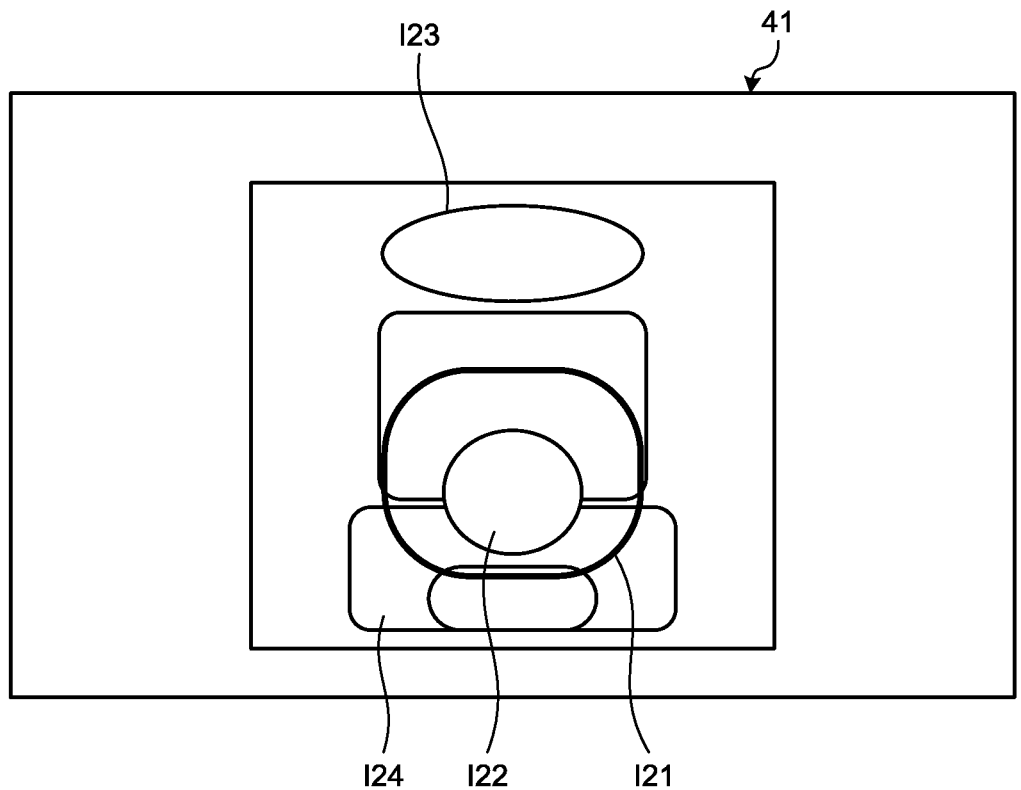
FIG. 8 is a schematic diagram illustrating an example of a display mode on the display unit of the monitoring system according to the embodiment.
Figure 9:
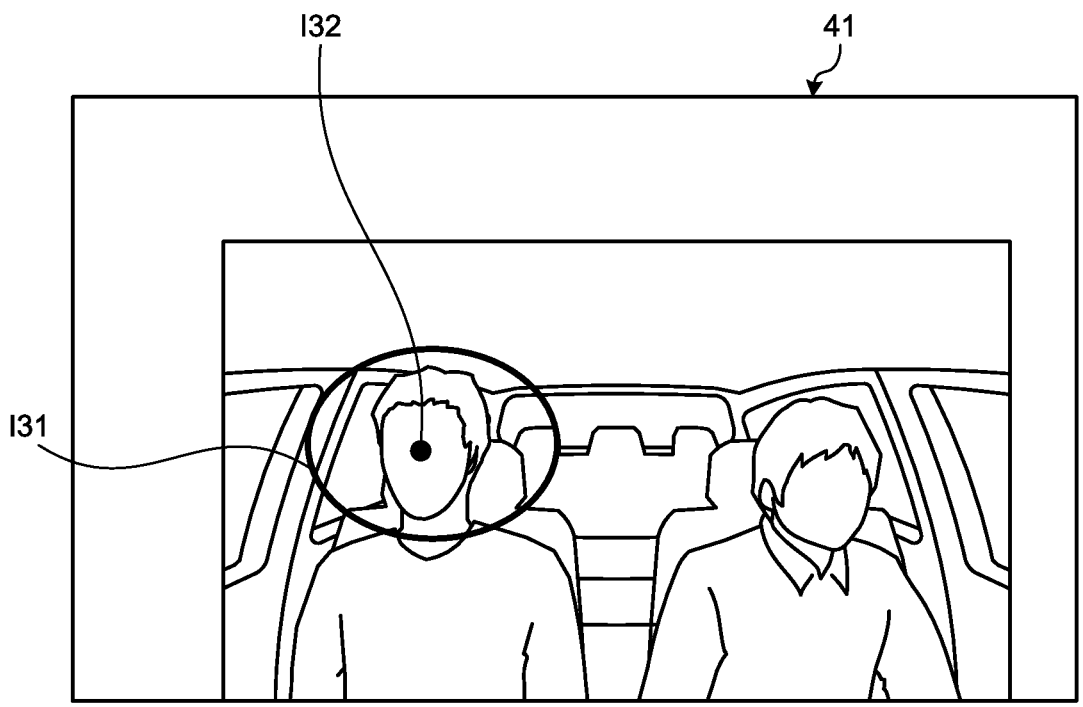
FIG. 9 is a schematic diagram illustrating an example of a display mode on the display unit of the monitoring system according to the embodiment.

The operation controller 84 of the present embodiment controls the display unit 41, and is capable of executing operating state display processing. The operating state display processing is processing to display the visual information representing a relative position of the detected target part position with respect to a preset appropriate monitoring position (hereinafter, called "operating state visual information" in some cases) on the display unit 41. Since the operation controller 84 executes the operating state display processing, the display unit 41 displays the operating state visual information representing a relative position of the detected target part position with respect to the appropriate monitoring position, as illustrated in FIGS. 4, 8, and 9. The appropriate monitoring position is a virtual position set in the interior compartment 101 of the vehicle 100 according to a sitting position of the monitoring target person OB as a position where the state of the monitoring target person OB can be appropriately monitored by the monitoring unit 83, and is a spatial region having a predetermined range. The appropriate monitoring position is set in advance, for example, according to an actual vehicle evaluation. For example, in the state in which the driver as the monitoring target person OB is sitting on the driver's seat 105 and normally driving the vehicle 100, a distribution of the position of the head is statistically obtained, and the appropriate monitoring position is set in advance based on the distribution. As described above, the detected target part position is the three-dimensional position of the monitoring target part TG, that is, herein, the head detected by the detector 83a based on the image including the monitoring target person OB captured by the imaging unit 3. The operation controller 84 may always display the operating state visual information on the display unit 41, or may appropriately display the operating state visual information in response to a request according to the operational input to the operation unit 6.

Figure 5:
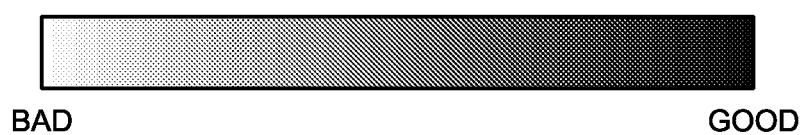
FIG. 5 is a schematic diagram illustrating an example of a change in display color on the display unit of the monitoring system according to the embodiment.

For example, as illustrated in FIG. 4, the display unit 41 may display, as the operating state visual information, a state display image I1 that changes in display color according to a relative position of the detected target part position with respect to the appropriate monitoring position. The state display image I1 is an image displayed in a substantially rectangular belt shape on the display surface of the display unit 41. For example, as illustrated in FIG. 5, the state display image I1 is displayed in a deeper display color (display color on the "good" side in FIG. 5) as the detected target part position is relatively closer to the appropriate monitoring position. In contrast, the state display image I1 is displayed in a lighter display color (display color on the "bad" side in FIG. 5) as the detected target part position is relatively farther from the appropriate monitoring position. In other words, the state display image I1 is displayed in the deeper display color to represent that the detected target part position is relatively closer to the appropriate monitoring position, and displayed in the lighter display color to represent that the detected target part position is relatively farther from the appropriate monitoring position. The operation controller 84 reads the state display image I1 stored in the storage unit 81, and displays the state display image I1 on the display unit 41 in a display color according to the relative positional relation between the appropriate monitoring position set in advance and the detected target part position of the monitoring target part TG detected by the detector 83a. The operation controller 84 changes the display color of the state display image I1 in a real-time manner according to the change in the detected target part position of the monitoring target part TG captured by the imaging unit 3 and detected by the detector 83a, and displays the state display image I1 on the display unit 41.

Figure 6:
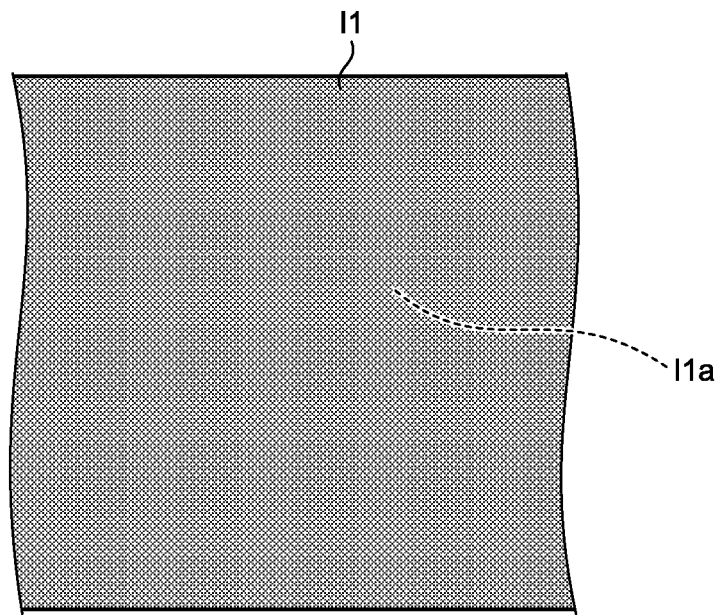
FIG. 6 is a schematic diagram illustrating an example of a notification image on the display unit of the monitoring system according to the embodiment.
Figure 7:
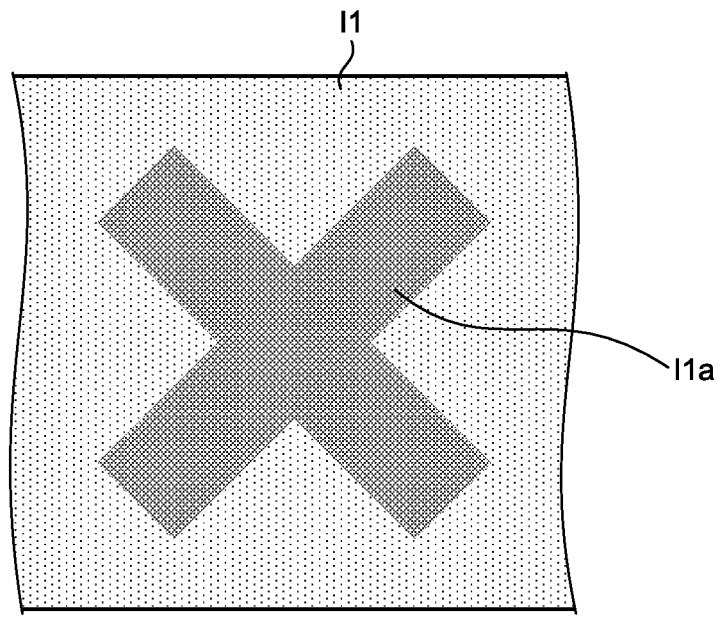
FIG. 7 is a schematic diagram illustrating an example of the notification image on the display unit of the monitoring system according to the embodiment.

In addition, for example, as illustrated in FIGS. 6 and 7, the display unit 41 may display a notification image I1a, in addition to the above-described state display image I1, as the operating state visual information. The notification image I1a is an image forming a notification figure for notifying the occupant that the detected target part position is relatively farther from the preset appropriate monitoring position. The notification image I1a is preferably, for example, a figure having a relatively simple shape easily, intuitively recognizable by, for example, the driver, and is a figure imitating the shape of "×" in the example of, for example, FIG. 7, but is not limited thereto. In this example, the operation controller 84 reads, for example, the notification image I1a stored in the storage unit 81, and displays the notification image I1a on the display unit 41 in the deeper display color (display color on the "good" side in FIG. 5) used in the case where the detected target part position is relatively closer to the appropriate monitoring position. In this case, as illustrated in FIG. 6, if the state display image I1 is displayed in the deeper display color, that is, if the detected target part position is relatively closer to the appropriate monitoring position, the notification image I1a is displayed in a manner assimilated into the state display image I1, and is brought into an almost invisible state. In contrast, as illustrated in FIG. 7, if the state display image I1 is displayed in the lighter display color, that is, if the detected target part position is relatively farther from the appropriate monitoring position, the notification image I1a is displayed in a manner overlapping the state display image I1 and standing out from the state display image I1, and is brought into a relatively more easily visible state. As described above, the display unit 41 can display the operating state visual information representing a relative position of the detected target part position with respect to the appropriate monitoring position in a more intuitively, quickly, and easily recognizable manner by displaying the notification image I1a in combination with the state display image I1.

For example, as illustrated in FIG. 8, the display unit 41 may display, as the operating state visual information, an appropriate position image I21 representing the appropriate monitoring position in combination with a detected position image I22 representing the detected target part position. The appropriate position image I21 illustrated in FIG. 8 is a frame-like image surrounding the appropriate monitoring position. The detected position image I22 is an image imitating the head serving as the monitoring target part TG of the monitoring target person OB, and in this example, is an image having a substantially elliptical shape. The appropriate position image I21 is a still image at a basically fixed position. In contrast, the detected position image I22 is a dynamic image that changes in display position according to the change in the detected target part position of the monitoring target part TG captured by the imaging unit 3 and detected by the detector 83a. The display unit 41 two-dimensionally displays a relative position of the detected target part position with respect to the appropriate monitoring position according to the relative positional relation between the appropriate position image I21 and the detected position image I22. In this example, the display unit 41 also displays a steering wheel image I23 imitating the steering wheel 104 and a seat image I24 imitating the driver's seat 105 in combination with the appropriate position image I21 and the detected position image I22. This display allows the monitoring system 1 to make a relative position of the detected target part position with respect to the appropriate monitoring position more easily, sensuously understandable. The detected position image I22 indicates that the detected target part position is in the appropriate monitoring position by being displayed in the appropriate position image I21, and indicates that the detected target part position is out of the appropriate monitoring position by being displayed outside the appropriate position image I21. The operation controller 84 reads the appropriate position image I21, the detected position image I22, the steering wheel image I23, and the seat image I24 stored in the storage unit 81, and displays them on the display unit 41 according to the relative positional relation between the appropriate monitoring position set in advance and the detected target part position of the monitoring target part TG detected by the detector 83a. The operation controller 84 changes the display position of the detected position image I22 in a real-time manner according to the change in the detected target part position of the monitoring target part TG captured by the imaging unit 3 and detected by the detector 83a, and displays the detected position image I22 on the display unit 41.

For example, as illustrated in FIG. 9, the display unit 41 may display, as the operating state visual information, an appropriate position image I31 representing the appropriate monitoring position in combination with a detected position image I32 representing the detected target part position. The appropriate position image I31 illustrated in FIG. 9 is a frame-like image surrounding the appropriate monitoring position. The detected position image I32 is a pointer image representing the position of the head serving as the monitoring target part TG of the monitoring target person OB. In the same manner as the appropriate position image I21, the appropriate position image I31 is a still image at a basically fixed position. In contrast, in the same manner as the detected position image I22, the detected position image I32 is a dynamic image that changes in display position according to the change in the detected target part position of the monitoring target part TG captured by the imaging unit 3 and detected by the detector 83a. In this example, the display unit 41 three-dimensionally displays a relative position of the detected target part position with respect to the appropriate monitoring position according to the relative positional relation between the appropriate position image I31 and the detected position image I32. In this example, the display unit 41 also displays an image (dynamic image) itself captured by the imaging unit 3 in combination with the appropriate position image I31 and the detected position image I32. This display allows the monitoring system 1 to make a relative position of the detected target part position with respect to the appropriate monitoring position more easily, sensuously understandable. The detected position image I32 indicates that the detected target part position is in the appropriate monitoring position by being displayed in the appropriate position image I31, and indicates that the detected target part position is out of the appropriate monitoring position by being displayed outside the appropriate position image I31. The operation controller 84 reads the appropriate position image I31, the detected position image I32, and the image captured by the imaging unit 3 that are stored in the storage unit 81, and displays them on the display unit 41 according to the relative positional relation between the appropriate monitoring position set in advance and the detected target part position of the monitoring target part TG detected by the detector 83a. In this case, the operation controller 84 may display the image captured by the imaging unit 3 on the display unit 41 as it is captured. The operation controller 84 changes the display position of the detected position image I32 in a real-time manner according to the change in the detected target part position of the monitoring target part TG captured by the imaging unit 3 and detected by the detector 83a, and displays the detected position image I32 on the display unit 41.

In the monitoring system 1 described above, the monitoring unit 83 detects the monitoring target part TG of the monitoring target person OB based on the image captured by the imaging unit 3 and monitors the state of the monitoring target person OB based on the detected target part position of the detected monitoring target part TG. In the monitoring system 1, the display unit 41 displays the visual information representing a relative position of the detected target part position with respect to the preset appropriate monitoring position. As a result, the monitoring system 1 can allow, for example, the monitoring target person OB to understand, through the visual information, whether the monitoring unit 83 is appropriately detecting the monitoring target part TG of the monitoring target person OB. For example, if the operating state visual information changes in response to an intentional movement of the monitoring target part TG by the monitoring target person OB, the monitoring system 1 can allow the monitoring target person OB to understand that the monitoring unit 83 is appropriately detecting the monitoring target part TG of the monitoring target person OB. If, instead, the operating state visual information does not change in spite of the intentional movement of the monitoring target part TG by the monitoring target person OB, the monitoring system 1 can allow the monitoring target person OB to understand that the monitoring unit 83 is not appropriately detecting the monitoring target part TG of the monitoring target person OB. As a result, the monitoring system 1 can allow the monitoring target person OB to understand the operating state. Accordingly, if, for example, the monitoring target person OB wears something (such as a broad-brimmed hat, a mask, or large sunglasses) preventing the detector 83a from detecting the monitoring target part TG, the monitoring system 1 can prompt the monitoring target person OB to take it off. The monitoring system 1 can also prompt the monitoring target person OB, for example, to locate the monitoring target part TG in the appropriate monitoring position. Accordingly, the monitoring system 1 can allow the monitoring unit 83 to more appropriately monitor the state of the monitoring target person OB.

For example, in the monitoring system 1 described above, the display unit 41 displays, as the visual information, the state display image I1 that changes in display color according to a relative position of the detected target part position with respect to the appropriate monitoring position. Accordingly, the monitoring system 1 can express the change in a relative position of the detected target part position with respect to the appropriate monitoring position in a simplified manner using the display color of the state display image I1. In other words, the monitoring system 1 can express, in a simplified manner, whether the detected target part position of the monitoring target part TG captured by the imaging unit 3 and detected by the detector 83a appropriately changes with the movement of the monitoring target part TG, allowing the monitoring target person OB to recognize the expressed result. As a result, the monitoring system 1 can allow the monitoring target person OB to understand the operating state, in a simplified manner.

For example, in the monitoring system 1 described above, the display unit 41 may display, as the visual information, the appropriate position image I21 or I31 representing the appropriate monitoring position in combination with the detected position image I22 or I32 representing the detected target part position. In this case, the monitoring system 1 can express a relative position of the detected target part position with respect to the appropriate monitoring position in an easily understandable manner using the relative positional relation between the appropriate position image I21 or I31 and the detected position image I22 or I32. In other words, the monitoring system 1 can express, in an easily understandable manner, whether the detected target part position of the monitoring target part TG captured by the imaging unit 3 and detected by the detector 83a appropriately changes with the movement of the monitoring target part TG, allowing the monitoring target person OB to recognize the expressed result. As a result, the monitoring system 1 can allow the monitoring target person OB to understand the operating state, in a more easily understandable manner.

In addition, in the monitoring system 1 described above, since the components including the imaging unit 3, the output unit 4, the illuminator 5, the operation unit 6, the external connection unit 7, and the controller 8 are provided in the housing 2, the entire monitoring system 1 can be unitized as the overhead module. This configuration allows the monitoring system 1 to improve ease of mounting thereof on the vehicle 100.

The monitoring system according to the embodiment of the present invention described above is not limited to the above-described embodiment, and can be variously modified within the scope of the invention described in the claims.

Although the above description has explained that, as an example of the monitoring target person OB in the interior compartment 101 of the vehicle 100, the monitoring unit 83 monitors the state of the driver sitting on the driver's seat 105, the monitoring target person OB is not limited to this example. The monitoring target person OB may be a passenger other than the driver of the vehicle 100. The monitoring target part TG has been described to be the head of the monitoring target person OB, but is not limited thereto, and may be, for example, an arm.

Although the above description has explained that the entire monitoring system 1 is provided on the surface on the interior compartment 101 side of the ceiling 102 of the vehicle 100 and constitutes the overhead module, the monitoring system 1 is not limited to this explanation. The monitoring system 1 may have, for example, a configuration in which the controller 8 is provided outside the housing 2 and is electrically connected to the components through wiring material, or may have, for example, a configuration in which the vehicle ECU for integrally controlling the components of the vehicle 100 is used also as the controller 8. For example, a display, a speaker, and the like of a navigation system mounted on the vehicle 100 may be used also as the display unit 41 and the speaker 42.

In the monitoring system of the present embodiment, the monitoring unit detects the monitoring target part of the monitoring target person based on the image captured by the imaging unit and monitors the state of the monitoring target person based on the detected target part position of the detected monitoring target part. The display unit of the monitoring system displays the visual information representing a relative position of the detected target part position with respect to the preset appropriate monitoring position. As a result, the monitoring system can allow the monitoring target person to understand, through the visual information, whether the monitoring unit is appropriately detecting the monitoring target part of the monitoring target person. Accordingly, the monitoring system provides an effect of allowing the monitoring target person to understand the operating state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring system comprising:
    an imaging unit configured to capture an image including a monitoring target person in an interior compartment of a vehicle;
    a monitoring unit configured to detect a monitoring target part of the monitoring target person based on the image captured by the imaging unit and monitor a state of the monitoring target person based on a detected target part position serving as a position of the detected monitoring target part; and a display unit provided in the interior compartment of the vehicle and configured to display visual information representing a relative position of the detected target part position with respect to a preset appropriate monitoring position added to the image, wherein, when the monitoring target part is within the preset appropriate monitoring position, the visual information comprises a display of the preset appropriate monitoring position at a size that is greater than that of the monitoring target part.

2. The monitoring system according to claim 1, wherein the display unit is configured to display, a notification image that is an image forming a notification figure for notifying the occupant that the detected target part position is relatively farther from the appropriate monitoring position, in addition to as the visual information, a state display image that changes in display color according to a relative position of the detected target part position with respect to the appropriate monitoring position.

3. The monitoring system according to claim 2, wherein the display unit is configured to display, as the visual information, an appropriate position image representing the appropriate monitoring position in combination with a detected position image representing the detected target part position.

4. The monitoring system according to claim 3, further comprising:
a housing that is provided on a surface on the interior compartment side of a ceiling of the vehicle, and to which the imaging unit, the monitoring unit, and the display unit are assembled.

5. The monitoring system according to claim 2, further comprising:
a housing that is provided on a surface on the interior compartment side of a ceiling of the vehicle, and to which the imaging unit, the monitoring unit, and the display unit are assembled.

6. The monitoring system according to claim 2, wherein the display unit is configured to display, if the detected target part position is relatively closer to the appropriate monitoring position, the notification image in a manner assimilated into the state display image and, if the detected target part position is relatively farther from the appropriate monitoring position, the notification image in a manner overlapping the state display image and standing out from the state display image.

7. The monitoring system according to claim 1, wherein the display unit is configured to display, as the visual information, an appropriate position image representing the appropriate monitoring position in combination with a detected position image representing the detected target part position.

8. The monitoring system according to claim 7, further comprising:
a housing that is provided on a surface on the interior compartment side of a ceiling of the vehicle, and to which the imaging unit, the monitoring unit, and the display unit are assembled.

9. The monitoring system according to claim 1, further comprising:
a housing that is provided on a surface on the interior compartment side of a ceiling of the vehicle, and to which the imaging unit, the monitoring unit, and the display unit are assembled.

10. The monitoring system according to claim 1,
wherein the monitoring target part comprises a head of a passenger of the vehicle, and
wherein the preset appropriate monitoring position comprises a circular shape displayed by the display of the visual information.

* * * * *